May 25, 1971 E. G. ZUBLER 3,580,856
GETTER COMPOSITION FOR ELECTRIC LAMPS
AND SIMILAR DEVICES
Filed May 22, 1969
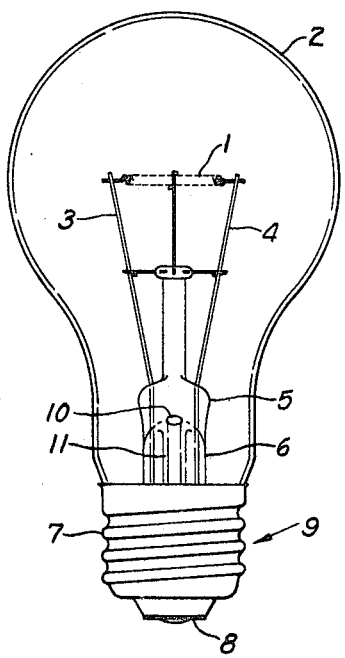
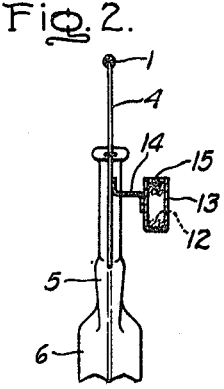
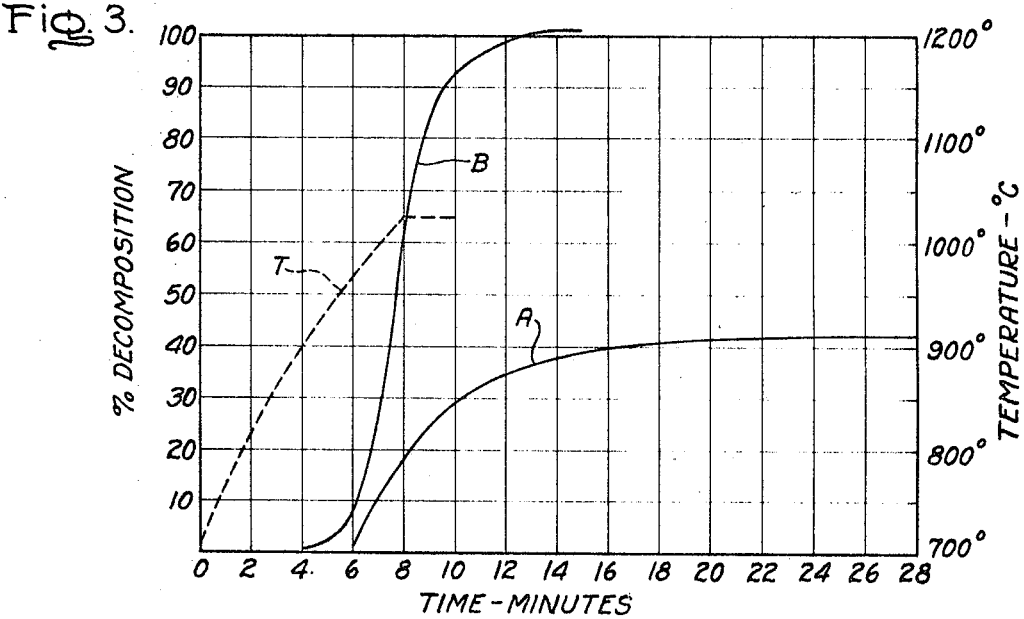
Inventor:
Edward G. Zubler
by Otto Tichy
His Attorney United States Patent Office 3,580,856
Patented May 25, 1971

3,580,856
GETTER COMPOSITION FOR ELECTRIC LAMPS
AND SIMILAR DEVICES
Edward G. Zubler, Chagrin Falls, Ohio, assignor to
General Electric Company
Filed May 22, 1969, Ser. No. 826,888
Int. Cl. H01j 7/18; H01k 1/56
U.S. Cl. 252—181.6                                     2 Claims

ABSTRACT OF THE DISCLOSURE

The rate and extent (to about 100%) of thermal decomposition of $P_3N_5$ getter are increased by providing a catalyzer metal in contact with the solid $P_3N_5$ or its primary gaseous decomposition products.

BACKGROUND OF THE INVENTION

(1) Field of the invention

The invention relates generally to the manufacture of electrical devices comprising a sealed envelope containing an electric energy translation element such as a filament or electrodes, and more particularly to an improvement in the gettering of such devices to clean up residual deleterious gases, particularly when the getter is phosphorus nitride.

(2) Description of the prior art

For many years past it has been customary to effect the clean up of residual gases in electric incandescent lamps by means of phosphorus, which is customarily applied as a slurry or suspension to the filament which is mounted in the lamp envelope, after which the envelope is evacuated and sealed, with or without an inert gas filling therein, and the getter is vaporized or sublimed by energizing the filament. In the case of gas-filled lamps it is the practice to use red posphorus alone, whereas in vacuum lamps the red phosphorus is mixed with a material such as cryolite.

Under certain conditions, including high temperatures attained in the course of lamp sealing, and especially during periods of high atmospheric humidity, the red phosphorus is subject to deterioration. It has recently been found that high stability and superior gettering action may be achieved by the use of pure crystalline phosphorus pentanitride ($P_3N_5$), as more fully disclosed and claimed in application Ser. No. 639,615 filed May 19, 1967, now U.S. Pat. No. 3,475,072 by J. A. Graves, and assigned to the same assignee as the present application.

SUMMARY OF THE INVENTION

I have determined that the extent of thermal decomposition of $P_3N_5$ from an open container in vacuum to nitrogen and a condensate is limited to a range of about 40–50 molar percent at temperatures in excess of about 800° C.

I have discovered, in accordance with this invention, that the efficacy or degree of decomposition of phosphorus nitride at the same temperature is materially enhanced, even to complete decomposition, by heating the phosphorus nitride while it, or its gaseous decomposition species, is in intimate physical contact with one of a number of metals which serve as a catalyzer for the decomposition process. This improved degree of decomposition occurs irrespective of the surrounding pressure. A presently preferred catalyzer is tungsten, especially for use in tungsten filament incandescent lamps. While tests have shown that the extent of decomposition is the same for amorphous and for crystalline $P_3N_5$, the pure crystalline material is preferred.

BRIEF DESCRIPTION OF THE DRAWING

In the drawing,
FIG. 1 is a front elevation of a conventional general purpose incandescent electric lamp in which the getter may be applied to the filament and vaporized therefrom;
FIG. 2 is a fragmentary side elevation of an incandescent lamp having a separate container from which the getter is vaporized; and
FIG. 3 is a graph showing decomposition plots of phosphorus nitride getter with and without the presence of a catalyzer metal.

DESCRIPTION OF THE PREFERRED EMBODIMENTS

The effect of catalyzers on $P_3N_5$ has been clearly demonstrated in the laboratory by me where, for example, a 0.200 to 0.400 mg. sample was weighed in a small quartz container which was then positioned in a quartz tube surrounded by a small furnace. After the system was pumped down to $10^{-5}$ torr for about three hours, the temperature of the sample was raised to 700° C. After approximately thirty minutes at this temperature, the system was isolated and the temperature raised to 1025° C. in about nine minutes. The $P_3N_5$ starts to decompose at about 800° C. producing nitrogen and a non-volatile material which condenses in the cool zone. The nitrogen pressure in the calibrated volume is continuously recorded with a thermistor gauge. A small mass spectrometer is used for qualitative analysis of the gas evolved. From the original weight of $P_3N_5$ and the nitrogen pressure, the percent decomposition can be calculated and plotted as a function of time. Various batches of $P_3N_5$ showed some differences in rate of decomposition; however, the various batches showed the same limited decomposition property in the range of about 40 to 50%. In FIG. 3, the curve A is a typical and reproducible composition plot for a particular batch.

The effect of a catalyzer in accordance with the invention was first demonstrated by adding about 15 mg. of high purity tungsten powder, about 1 micron particle size, to some 0.200 mg. $P_3N_5$ samples. The temperature was increased from 700 to 1025° C. at the rate shown by the curve T in FIG. 3 where the temperature is shown along the right hand ordinate.

The tungsten powder had a dramatic effect on the rate and extent of decomposition as demonstrated by curve B in FIG. 3. The decomposition was greatly increased by the tungsten particles, curve B actually showing decomposition slightly exceeding 100% which is within the limits of experimental error. It will be evident that for maximum gettering efficacy in a lamp, this rapid and complete decomposition of the $P_3N_5$ to some form of pohsphorus is desirable. In a lamp, only a small fraction of the getter is in physical contact with the usual tungsten filament, and it is therefore desirable to incorporate a small quantity of tungsten powder into the slurry which may comprise $P_3N_5$ getter in amyl acetate.

Referring to FIG. 1, the slurry of $P_3N_5$ getter and catalyzer is most conveniently applied to the filament 1 of an incandescent lamp. As herein illustrated, the lamp is of a conventional type comprising a sealed glass bulb 2 containing the filament 1 which may be a helical coiled-coil having its ends secured to lead-in conductors 3 and 4 which have portions thereof hermetically sealed in the press or pinch portion 5 of a glass stem tube 6 which has a flared lower end (not shown) sealed by fusion to the neck of bulb 2. The lead wires 3 and 4 extend to respective shell 7 and eyelet 8 contacts of a screw base 9 which is secured to the lower end of the neck of bulb 2. The bulb is evacauted and may be filled with a suitable inert gas through an exhaust tube 10 which extends through stem tube 6 and communicates with the interior of bulb 2 through an exhaust aperture 11. It is well recognized in the art that such a conventional gas-filled lamp is manufactured and operates with the gas filling pressure at substantially atmospheric pressure or sometimes in excess of atmospheric.

Since only a small fraction of the $P_3N_5$ on the lamp filament 1 is in physical contact with the tungsten surface and the temperature is increased to a high value, about 1900° C. for example, in a very short time, the tungsten filament surface probably plays a very minor role in the decomposition process. When the mixed powdered $P_3N_5$ and tungsten powder are flashed off the filament as small particles, they circulate in the gas stream past the hot filament 1 and are maintained in close physical relationship to achieve complete decomposition of the $P_3N_5$. In one lamp test a relatively poor batch of $P_3N_5$, based on previous lamp tests, was used with considerably improved results when subjected to testing for the presence of oxygen by the extremely sensitive testing equipment described and claimed in Pat. 3,194,110 to H. J. Eppig et al. The lamps of this and other tests were at the pressure approximately equal to atmospheric pressure (760 mm. of Hg); however, the same results would be expected if the lamps were vacuum lamps or at a pressure in excess of atomspheric pressure.

In FIG. 2 there is illustrated an alternative method of heating the getter to achieve complete decomposition of the $P_3N_5$. In this case the $P_3N_5$ powder 12 is placed in a container 13 which may be a tubular cup or cylinder of suitable metal such as nickel or molybdenum, for example, and which may be supported by a wire member 14 secured at one end to the container 13 and at its other end to a lead wire 4. The upper end of the container 13 is filled with a filter-like mass or plug 15 of wire made of the catalyzer metal, preferably tungsten. In this case, the cup 13 is heated by any suitable means such as high frequency induction to a temperature above the decomposition temperature (800° C.) of the $P_3N_5$, and the tungsten wire ball 15 is in the path of, and comes in contact with, the gaseous decomposition products. Presumably, the tungsten wire 15 catalyzes the further decomposition of gaseous $P_xN_y$ species producing the more volatile P species.

In laboratory tests similar to those described above, but with the $P_3N_5$ contained in a quartz cylinder or cup having a tungsten wire plug at the top thereof, complete breakdown of the $P_3N_5$ was achieved at a slightly lower rate than with the mixed powdered tungsten and $P_3N_5$.

The proportion of tungsten powder to $P_3N_5$ powder is not critical. Amounts of tungsten from 10 to 20% by weight of the $P_3N_5$ have given good results, and up to 100%, i.e., equal weights of tungsten and $P_3N_5$, did not increase the yield nor did it adversely effect the light output of the lamp. By way of example only, a slurry of $P_3N_5$ plus 20 weight percent tungsten in butanol or amyl acetate may be applied to the filament of a 40 watt lamp.

A number of metals other than tungsten also enhance the rate and decomposition of $P_3N_5$. For example, molybdenum and nickel, like tungsten, increased the extent of decomposition to about 100%. Other metals useful as catalyzer are rhenium, titanium, zirconium, rhodium, palladium, osmium, iridium and platinum. Metals such as silver, aluminm and magnesium have too high a vapor pressure and would also adversely effect the tungsten filament of the lamp. It was also shown that pure graphite had no effect on the decomposition of $P_3N_5$.

What I claim as new and desired to secure by Letters Patent of the United States is:

1. A getter composition consisting essentially of an intimate mixture of finely divided pure $P_3N_5$ and a catalyzer metal selected from the group consisting of tungsten, molybdenum, rhenium, nickel, titanium, zirconium, hafnium, vanadium, niobium, tantalum, rhodium, palladium, osmium, iridium, and platinum, said catalyzer metal being in an amount sufficient to increase the degree of decomposition of the $P_3N_5$ when said mixture is heated in a vacuum.

2. A getter composition as defined in claim 1 wherein the catalyzer metal is tungsten.

References Cited

UNITED STATES PATENTS

| | | | |
|---|---|---|---|
| 1,752,747 | 4/1930 | Lederer | 313—179 |
| 1,895,855 | 1/1933 | Lockwood | 252—181.2 |
| 3,475,072 | 10/1969 | Graves. | |

TOBIAS E. LEVOW, Primary Examiner

J. COOPER, Assistant Examiner

U.S. Cl. X.R.

316—3